Feb. 4, 1936.  R. E. KEYES  2,030,032

AIR CONDITIONING SYSTEM EMPLOYING REFRIGERATION

Filed Sept. 7, 1934  2 Sheets-Sheet 1

Inventor
ROBERT E. KEYES,
by Robert T. Palmer
Attorney

Feb. 4, 1936. R. E. KEYES 2,030,032
AIR CONDITIONING SYSTEM EMPLOYING REFRIGERATION
Filed Sept. 7, 1934  2 Sheets-Sheet 2
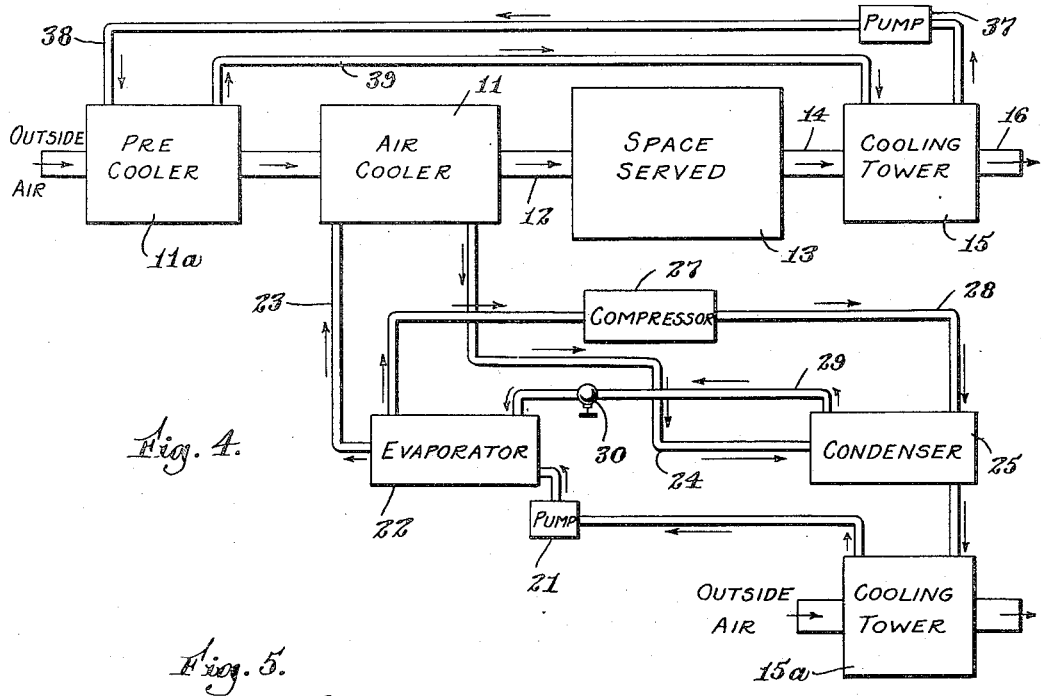
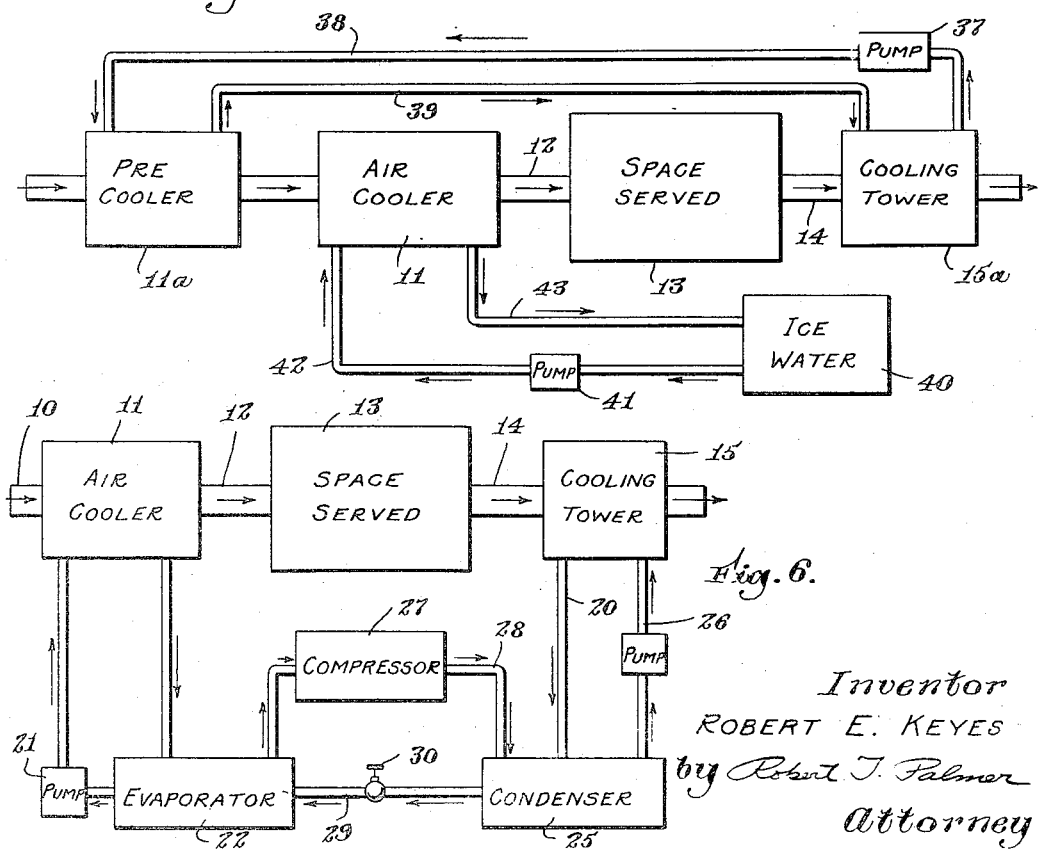
Inventor
ROBERT E. KEYES
by Robert T. Palmer
Attorney Patented Feb. 4, 1936

2,030,032

UNITED STATES PATENT OFFICE 2,030,032

AIR CONDITIONING SYSTEM EMPLOYING REFRIGERATION

Robert E. Keyes, Dedham, Mass., assignor to The Cooling & Air Conditioning Corporation, New York, N. Y.

Application September 7, 1934, Serial No. 743,059

4 Claims. (Cl. 62—129)

This invention relates to the cooling of air by refrigeration, and relates more particularly to methods and apparatus for decreasing refrigeration costs in air cooling installations.

It is the general practice in air cooling installations to recirculate from the space served, through the cooling unit, the larger part of the air formerly cooled therein, only a small portion of the air being exhausted into the atmosphere. The reason for the recirculation of the formerly cooled air through the cooling unit is that a saving in refrigeration is obtained due to the fact that the recirculated air is nearer in humidity and temperature to that desired than the outside air.

But in many cases, such as in some hospitals, it is required that all of the conditioned air be fresh air, none of which is recirculated, and all of which is exhausted to the atmosphere after being cooled and after passing through the space being served. Also, in some industrial plants, undesired gases are added to the air during its passage through the space being served, which prevents recirculation through the cooling unit. Again, in other installations, where considerable air is recirculated, a considerable portion of the air is also exhausted.

Since the cold air thus exhausted in such instances is in large quantities and is at a much lower temperature than the outside air which is drawn into the conditioning unit to be cooled, it may be appreciated that this air contains considerable "cold energy" which is being thrown away.

According to this invention, substantially all of the "cold energy" in the air exhausted from an air cooling system is recovered and utilized to reduce the amount and expense of refrigeration required to cool the air being conditioned. In one embodiment of the invention, the previously cooled air which is exhausted from the space being served, passes through a cooling tower, in which a water spray is projected, and cools, through intimate contact with the spray particles, the spray water, which is then cooled to a lower temperature by mechanical refrigeration and then circulated through the air cooler.

In another embodiment of the invention, fresh, outside air and the exhaust air from the conditioned space is mixed and passed through the cooling tower, where it cools the spray water which is then cooled to a lower temperature by mechanical refrigeration and then circulated through the air cooler.

In another embodiment of the invention, a two-stage cooling tower is provided; the condenser water is sprayed in the first stage through which fresh, outside air is passed to cool, by evaporative cooling, the condenser water. The condenser water thus cooled is then sprayed in the second stage of the cooling tower, through which the exhaust air from the conditioned space passes, to further cool the condenser water. The condenser water is then cooled to a lower temperature by mechanical refrigeration and then circulated through the air cooler.

In another embodiment of the invention, a cooling tower through which atmospheric air is passed, cools water, which is then cooled to a lower temperature by mechanical refrigeration and then is passed through the air cooler. The cold exhaust air from the space being served passes through another cooling tower in which it cools water in a second circuit. The water from this second cooling tower is circulated through a pre-cooler in advance of the air cooler, which is served by mechanical refrigeration.

In another embodiment of the invention, mechanical refrigeration is not used, but the air cooler is cooled with ice water, which may be cooled or provided through the action of melting ice. This ice water is circulated through a main air cooler, which is connected directly to the space to be served. The cold exhaust air from the space to be served is passed through the cooling tower, in which a water spray is projected. The water returned from this spray is circulated through a pre-cooler arranged in advance of the main air cooler.

In another embodiment of the invention, the cold air exhausted from the space being served passes through a cooling tower, in which a water spray is projected, and the water spray returned from the cooling tower is used to cool the condenser coils of the mechanical refrigeration system, which acts to cool the air, which is supplied to the space being served, in the first instance.

The invention will now be described with reference to the drawings, of which:

Fig. 4 is a diagrammatic view, similar to Fig. 1, except that the cooling tower, supplied by exhaust air, serves to cool the air in a pre-cooler;

Fig. 5 is a diagrammatic view, similar to Fig. 4, except that the mechanical refrigeration equipment is replaced by an ice water supply, and Fig. 6 is a diagrammatic view showing a cooling tower supplied with cold exhaust air from the conditioned air space, the spray water from the cooling tower being used to cool the condenser coils in a mechanical refrigeration system.

Figure 1:
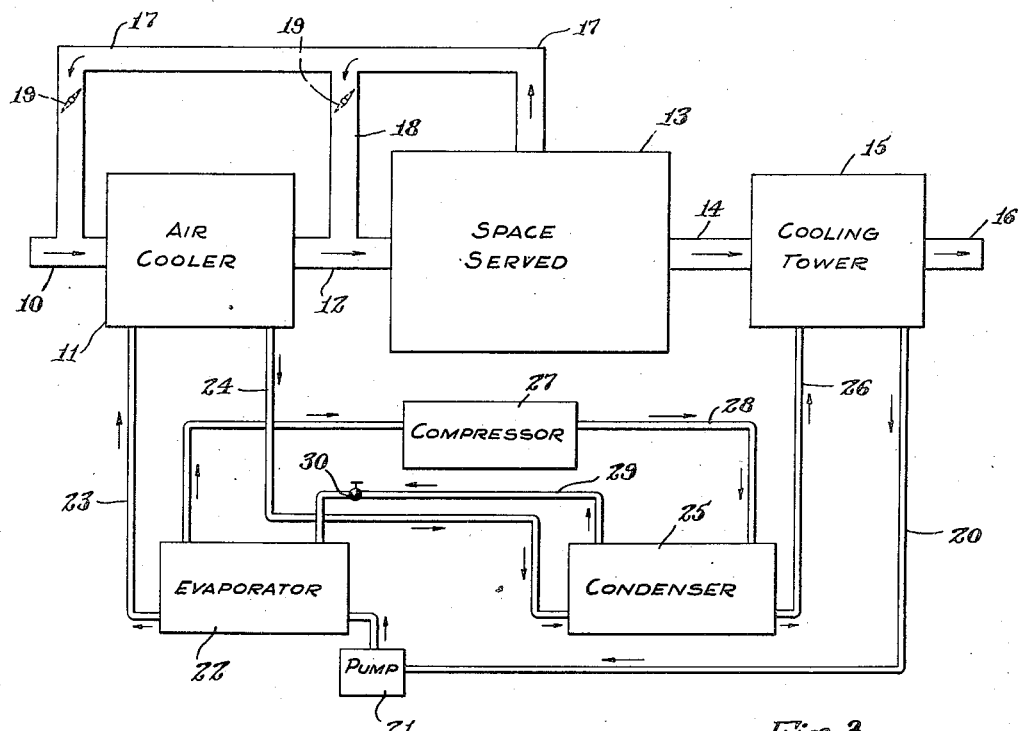
Fig. 1 is a diagrammatic view of air conditioning apparatus according to this invention, in which the cold, exhaust air from the space being served partially cools water which is then cooled an additional amount by mechanical refrigeration and then supplied to the air conditioning equipment.

As shown by Fig. 1, atmospheric air passes through the duct 10 into the air cooler 11, where it is cooled, and then passes through the supply duct 12 into the space served 13, the exhaust air from the space served passing through the duct 14, into the cooling tower 15, and being exhausted from the cooling tower through the exhaust duct 16. The system may be provided with the ordinary recirculation duct 17 and by-pass duct 18, which latter may be provided with the usual type dampers 19 to control the proportions and quantities of by-passed and recirculated air. The cooling tower 15 is of the usual type in which a water spray is projected and which is cooled by the evaporative cooling action of the air passing therethrough. In operation, the water returned from the spray in the cooling tower 15 passes through the pipe 20, into the pump 21, and then into the evaporator 22, where the water is cooled to a lower temperature by the absorption of heat in the evaporator coils, and then passes through pipe 23 into the air cooler 11, which may be either of the extended surface coil type, or of the spray or washer type. The water returned from the air cooler passes through the pipe 24 and then to the condenser 25, where it acts to cool the condenser coils, and then passes through the pipe 26, which leads to the spray nozzles in the cooling tower 15. The usual compressor 27 supplies refrigerant through the pipe 28 to the condenser 25, where it is cooled and condensed, after which it passes through the pipe 29 and expansion valve 30 into the evaporator coils of the evaporator 22.

In operation, the water passing from the condenser 25, through the pipe 26, is projected from the usual spray nozzles in the cooling tower 15, and cold exhaust air passes through the duct 14 into the cooling tower 15, in intimate contact with the spray particles. Due to the fact that the exhaust air has been previously dehumidified in the air cooler 11, it has both a lower wet bulb and dry bulb temperature than the outside air, and is thus more effective in cooling the spray water projected in the cooling tower. The water returned from the spray in the cooling tower passes through the pipe 20, through pump 21, to the evaporator 22, where it is cooled to a temperature low enough to suitably cool and dehumidify the air passing through the air cooler 11.

In some installations, the recirculated air duct 17 and by-pass air duct 19 would either or both not be used, and all outside air would be conditioned. In other installations, some recirculated air would be conditioned, but most of the conditioned air would be outside air and the present invention would be more effective in these cases, since the amount of cold air exhausted corresponds to the amount of outside air taken in, and, of course, the more cold air which is exhausted from the space served, the more "cold energy" is usually thrown away, and the more "cold energy" is recovered, according to this invention.

In some locations where the outside air has a low wet bulb temperature, the outside air may be used to advantage to effect economies in refrigeration. Accordingly, Figs. 2 and 3 illustrate arrangements whereby outside air may be used to cooperate with the cold exhaust air, according to this invention, to decrease further, refrigeration costs.

Figures 2, 3:
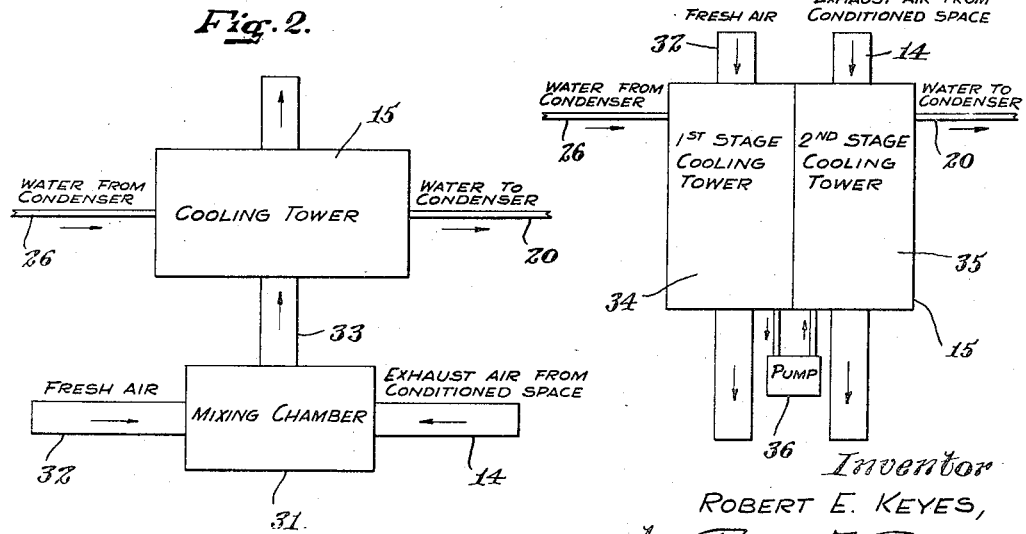
Fig. 2 is a diagrammatic view of another type of cooling tower which may be used to replace that shown by Fig. 1, wherein mixed atmospheric air and cold exhaust air from the space being served is used for cooling water.
Fig. 3 is a diagrammatic view of another type of cooling tower, which may be used to replace that of Fig. 1, which comprises two stages, the first of which atmospheric air is used to cool the spray water, and, in the second stage, the water returned from the first stage is cooled to a lower temperature by the exhaust air from the conditioned space.

In Fig. 2, the cooling tower 15 is provided with a mixing chamber 31, into which the cold exhaust air from the duct 14 passes, and with a fresh air duct 32 through which atmospheric air passes. The mixed exhaust air and fresh air pass through duct 33 into the cooling tower 15, where they act jointly to cool the spray water projected therein.

In the arrangement shown by Fig. 3, the cooling tower 15 has the two stages 34 and 35. In the first stage 34, fresh air passes through the duct 32 and cools the spray water which is projected therein. The water, which is returned from the spray, is forced by the pump 36 into the second stage 35, where it is projected in another spray, which is then contacted with by the cold exhaust air from the cold, previously dehumidified, exhaust air, which enters the cooling duct through the duct 14 from the space being served. The water from this second stage passes again through the pipe 20 to the evaporator, where it is cooled to a still lower temperature, and is then passed through the air cooler to cool and dehumidify the air.

In the embodiment illustrated by Fig. 4, the arrangement is similar to that shown by Fig. 1, except that the cooling tower 15 of Fig. 1 now serves to supply cold water to a pre-cooler 11a and the cooling tower 15a, through which atmospheric air passes to cool the spray water used to perform the function performed in Fig. 1 by the cooling tower 15. Since the other apparatus is identical with that shown by Fig. 1, the same numeral characters are used to identify corresponding apparatus.

In the operation of the system shown by Fig. 4, two separate water circuits are provided, one being the circuit from cooling tower 15a, through evaporator 22, air cooler 11, condenser 25, as in Fig. 1, and the other being a circuit including cooling tower 15, the pump 37, and the pre-cooler 11a. The spray in the cooling tower 15 is cooled from the cold dehumidified air exhausted from the space 13, and the spray water thus cooled is collected and forced by the pump 38 through the pipe 38 to the pre-cooler 11a, where it acts to pre-cool the outside air, which, after pre-cooling, passes into the main air cooler 11. The water, after it passes through the pre-cooler 11a, is then forced back through the pipe 39 to the spray nozzles in the cooling tower 15.

In the embodiment illustrated by Fig. 5, mechanical refrigeration is not used, but an ice water tank 40 is provided for supplying ice water to the air cooler 11. Provision may be made to add ice cakes from time to time to cool the ice water in the tank 40, and this ice water is forced by the pump 41, through pipe 42, to the air cooler 11, and is returned through pipe 43 to the tank 40. The cooling tower 15 performs, as described in connection with Fig. 4, to cool, by means of the cold and dehumidified, exhaust air from the space 13, spray water which is collected and then forced by pump 37, through pipe 38, to pre-cooler 11a, where it acts to pre-cool the air which is later acted upon by the main air cooler 11.

The embodiment of the invention illustrated by Fig. 6 is similar to that of Fig. 1, except that the cold water from the cooling tower 15, instead of being forced by pump 21 through the evaporator and then into the air cooler, passes directly into the condenser 25, and from the condenser back into the cooling tower through the pipe 26. Obviously, the cooling tower arrangements of Figs. 2 and 3 may be used to replace the cooling tower shown by Fig. 6, as described in connection with Figs. 1, 2 and 3.

Whereas several embodiments of the invention have been described for the purpose of illustration, it is to be understood that the invention is not limited to the details described, since many modifications may be made by those skilled in the art without departing from the spirit of the invention.

What is claimed is:

1. Air conditioning apparatus comprising an air cooler, a refrigeration plant including an evaporator for supplying a cooling effect to said cooler, means for passing air to be cooled through said cooler and into the space to be served, and for exhausting a portion of the cold air from the space, a cooling tower, means for directing said exhaust air through said tower, and means for passing the spray water returned in said cooling tower through said evaporator and then through said cooler.

2. Air conditioning apparatus comprising an air cooler, a refrigeration plant including an evaporator and a condenser for supplying a cooling effect to said cooler, means for passing air to be cooled through said cooler and into the space to be served, and for exhausting a portion of the cold air from the space, a cooling tower, means for directing said exhaust air through said tower, and means for passing the spray water returned in said cooling tower through said evaporator and then through said cooler and condenser.

3. Air conditioning apparatus comprising an air cooler, a refrigeration plant including an evaporator and a condenser for supplying a cooling effect to said cooler, means for passing air to be cooled through said cooler and into the space to be served, and for exhausting a portion of the cold air from the space, a cooling tower, means for directing outside air and said exhaust air through said cooling tower to cool the spray water by evaporative cooling, and means for passing the spray water returned in said cooling tower through said evaporator and then through said cooler.

4. Air conditioning apparatus comprising an air cooler, a refrigeration plant including an evaporator for supplying a cooling effect to said cooler, means for passing air to be cooled through said cooler and into the space to be served, and for exhausting a portion of the cold air from the space, a cooling tower, means for passing outside air through said tower where it acts to cool by evaporative cooling the spray water, means for passing said exhaust air through said tower where it acts to cool the spray water to a lower temperature, and means for passing the spray water returned in said cooling tower through said evaporator and then through said cooler.

ROBERT E. KEYES.